UNITED STATES PATENT OFFICE.

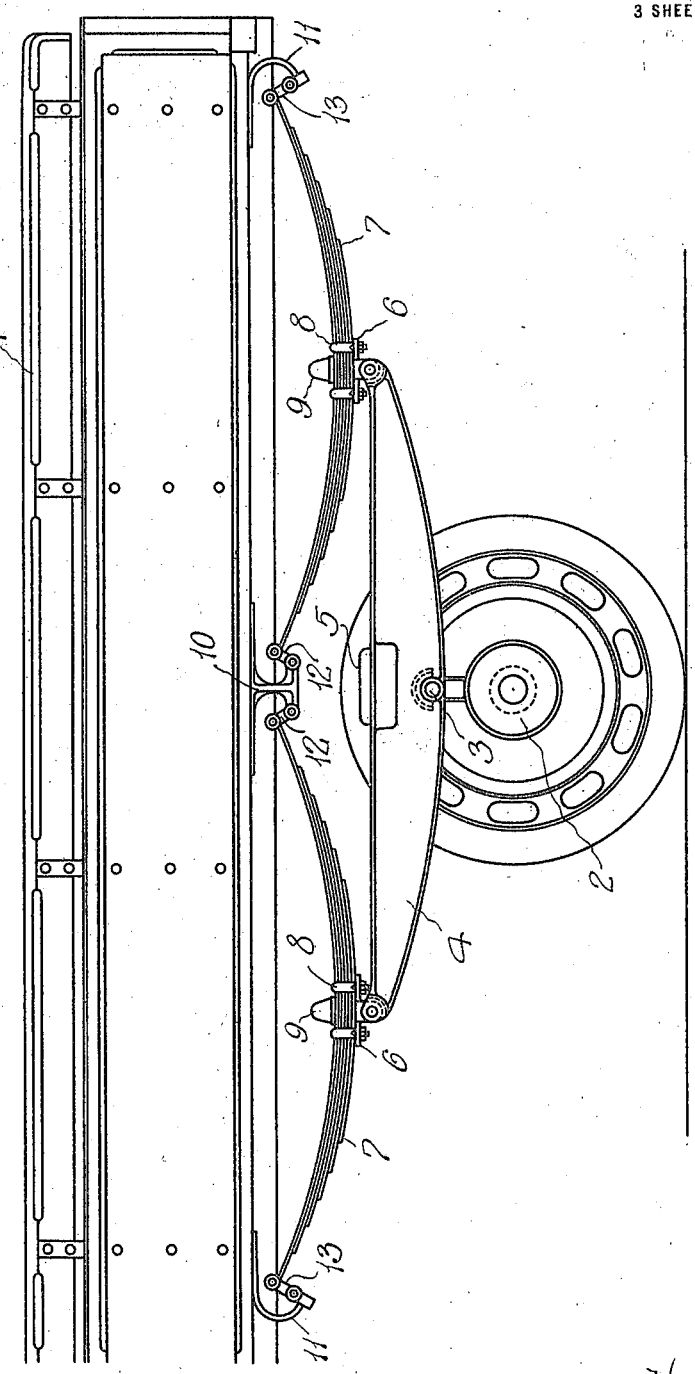

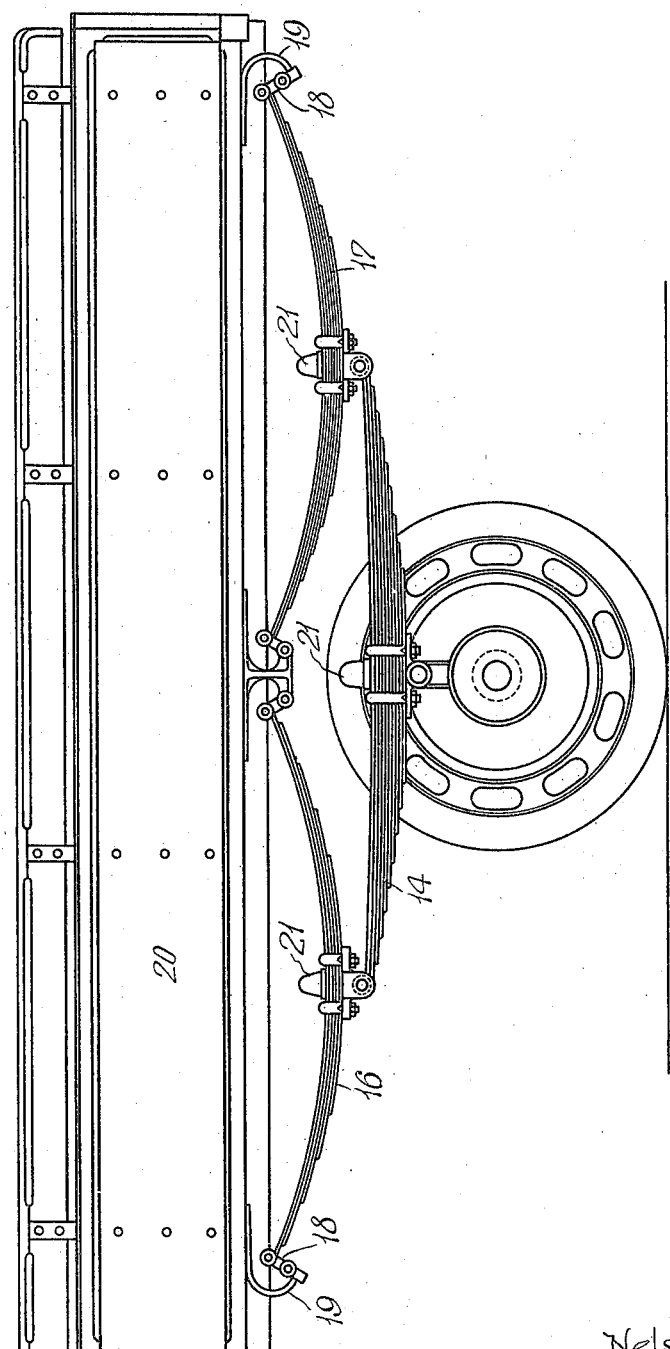

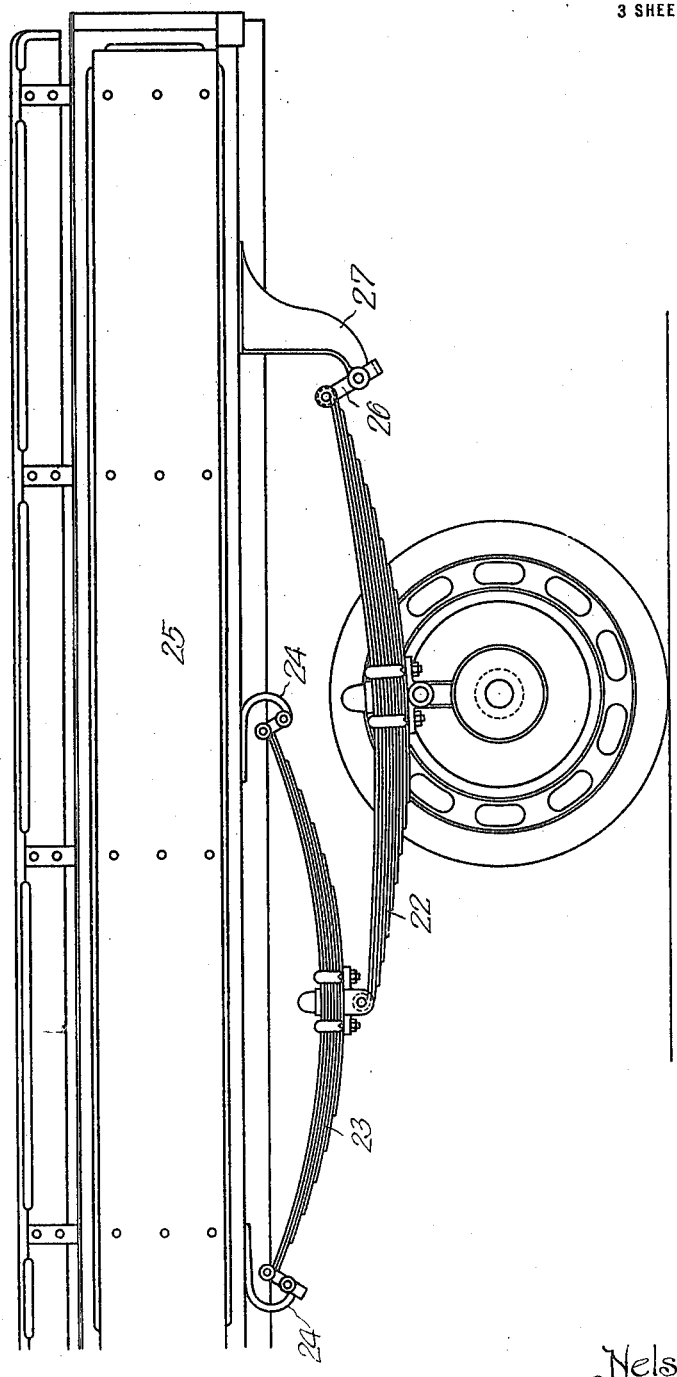

NELS L. OLSON, OF DETROIT, MICHIGAN.

SPRING SUSPENSION FOR VEHICLES.

1,233,903.  Specification of Letters Patent.  Patented July 17, 1917.

Application filed January 24, 1917. Serial No. 144,175.

*To all whom it may concern:*

Be it known that I, NELS L. OLSON, a citizen of the United States of America, residing at Detroit, in the county of Wayne and State of Michigan, have invented certain new and useful Improvements in Spring Suspensions for Vehicles, of which the following is a specification, reference being had therein to the accompanying drawings.

It is the present practice to suspend the supporting frame or body of a vehicle above the chassis or rear axle thereof by means of side springs, heavy enough or possessing a degree of resistance that will yieldably compensate for a maximum load. It is a well known fact that with this construction, the springs being necessarily heavy, do not flex or begin to show a degree of deflection until a reasonable load has been placed on them. If the load is too light, the springs have practically no action and the vehicle rides hard just the same as if the load was resting directly on the axle. It is only when a full load is carried that the spring action is felt and the road shocks absorbed.

In order to remedy this defect and improve the resiliency under various loads, I have devised a spring suspension wherein two or more springs or resilient members are used at each side of the vehicle body, in lieu of the single large springs ordinarily employed. It is preferable to use semi-elliptic or leaf springs, and by a novel arrangement of the same, I obtain practically four points of support on each side of the vehicle or body frame, and four places of attachment for the springs. An extended length of spring suspension is secured for long bodies or frames, that is, the spring support is distributed through an extended length of the body, and by the double spring arrangement, the pressed steel frames now used in connection with long trucks may be materially lightened or perhaps entirely dispensed with.

My invention further aims to provide a spring suspension wherein rigid or yieldable equalizing members are utilized as supports for springs relative to a vehicle axle or a part thereof, so that stresses and strains may be properly distributed throughout the spring suspension. It is in such a spring suspension that I have also devised means whereby springs may be successively brought into action as the load on a vehicle is increased, and provision is made whereby certain of the springs will at all times cushion a vehicle body when empty or devoid of a load.

My invention will be hereinafter considered in detail and reference will now be had to the drawings, wherein—

Figure 1 is a side elevation of a spring suspension of the preferred form of construction;

Fig. 2 is a similar view of a modified form of construction, and

Fig. 3 is a similar view of a further modification of my invention.

Referring first to Fig. 1, the reference numeral 1 denotes a portion of a supporting frame or vehicle body disposed above and in spaced relation to a rear axle housing 2 or the equivalent thereof. The rear axle housing or parts associated therewith are provided with supporting pins 3 and fulcrumed or pivotally mounted upon said pins are equalizing members or beams 4. As the construction and arrangement of parts are identical at both sides of the vehicle frame or body 1, I deem it only necessary to refer to one of the equalizing members 4 and the connections between said members and the sides of the frame or body 1.

Intermediate the ends of the equalizing member 4 is a buffer or yieldable pad 5 and at the ends of said member are pivoted spring perches or brackets 6 providing seats for laminated or leaf springs 7. The leaf springs 7 are disposed in a vertical plane, one in advance of the other, with the confronting ends extending over the equalizing member 4 and said springs are held upon the brackets 6 by straps 8 or other fastening means in the usual and well known manner. The brackets or perches 6 are provided with buffers or yieldable pads 9.

The frame or body 1 is provided with hangers 10 and 11, the hangers 11 being two in number with the hanger 10 in an intermediate position above the buffer 5 of the fulcrumed equalizing member 4. The confronting ends of the springs 7 are connected to the hanger 10 by shackles 12 and the hangers 11 are curved or designed so that the outer ends of the springs 7 may be connected thereto by shackles 13.

A load on the frame or body 1 causes the springs 7 to be simultaneously flexed, and since the member or beam 4 is fulcrumed relative to its support, the springs 7 will be properly positioned to receive equal stresses and strains produced by the load. With the distance between the buffers 9 and the frame or body 1 the equivalent of the distance between the hanger 10 and the buffer 5, the buffers 5 and 9 will coöperate in cushioning an excessive load after the springs 7 have been flexed.

Referring now to Fig. 2, it will be noted that a heavy laminated or leaf spring 14 is substituted for the equalizing member or beam 4 of the preferred form of construction, and besides the spring 14 serving as a fulcrumed equalizing member, it also serves as cushioning means for a heavy or excessive load, as will hereinafter appear. At the ends of the springs 14 are brackets for springs 16 and 17 connected by shackles 18 to hangers 19 of a vehicle frame or body 20. As indicated in this view of the drawing, the spring 16 is lighter or possesses a greater degree of flexibility than the spring 17 and the same is true in connection with this spring relative to the main spring 14. Buffers are used in connection with all of the springs and when the vehicle is empty, the springs 16 are really the only ones brought into action, as these springs are designed to simply cushion the vehicle body, when empty, and thus absorb all light shocks and insure easy riding of the vehicle body or frame.

When a load is placed on the vehicle body or frame the springs 17 are brought into action and together with the springs 16 are flexed to that extent that the vehicle body or frame may rest upon the buffers 21 of said spring. As a matter of fact, the springs 14 16 and 17, all coöperate in sustaining a load so long as the vehicle body or frame does not rest upon the buffers 21 of the springs 16 and 17, but when the load is increased to that extent as to render the springs 16 and 17 inactive, then the main or heavy spring 14 is positively brought into action to sustain and cushion the heavy load. With the load on the ends of the springs 14, the vehicle body or frame is cushioned until the intermediate hanger engages the buffer 21 of the main spring, so by utilizing these springs at each side of the vehicle body or frame, there is a coöperation of the springs for a wide range of yieldable suspension.

Considering the modification shown in Fig. 3, there is a fulcrumed resilient equalizing member 22 having the forward end thereof provided with a spring 23 connected to hangers 24 of a vehicle body 25. The rear end of the equalizing member 22 is connected by a shackle 26 to a depending bracket or hanger 27 carried by the vehicle body, and it is to be noted that this particular hanger or bracket has been substituted for the spring 17 shown in Fig. 2. With the rear end of the equalizing member connected to the vehicle body, as shown, it is still possible for the equalizing member to turn on its fulcrum and properly balance a load relative to the rear axle casing, and at the same time flexed by an excessive load.

With either arrangement of spring suspension, it is apparent that with the springs in longitudinal alinement at the sides of a truck frame or vehicle body that an exceedingly long frame or body can be yieldably supported relative to an axle, and that even though the vehicle is not evenly loaded, that all of the springs are more or less brought into action. For instance, again considering the preferred form of construction and assuming that a load is simply placed on the rear end of a truck, the rear set of springs 7 will undoubtedly be flexed to a greater degree than the forward set of springs. As the load tends to flatten the rear set of springs 7, the equalizing members 4 are slightly rocked and tend to flatten the front set of springs 7, thus causing said springs to yieldably resist, in conjunction with the rear set of springs 7, a downward pressure on the rear end of the truck caused by the load being placed thereon. This same spring action is also true in connection with the modified form of construction, but the resilient equalizing members 14 will coöperate more readily with the remaining springs than the rigid fulcrumed equalizing members of the preferred form of construction. It is therefore evident that one set of springs may be brought into action in advance of another set, either incurred by different loads or the shifting of a load, and while the above are a few of the advantages gained by my invention, I would have it understood that there are others and that my invention is not limited to the precise construction and arrangement of parts shown other than that defined in the appended claims.

What I claim is:—

1. The combination of a vehicle body, of a spring suspension at each side thereof comprising fulcrumed equalizing members, and longitudinally disposed resilient members on the ends of said fulcrumed equalizing members and providing a four point support for said body on said spring suspension.

2. The combination of a vehicle body, resilient equalizing members fulcrumed below said body, means for supporting said members, and front and rear sets of springs on the ends of said members providing four points of support for said body at each side thereof.

3. In a spring suspension for vehicles, fulcrumed equalizing members, and front and rear sets of springs carried by the ends of said members with one set of springs having a greater degree of flexure than the other set of springs.

4. The combination with a rear axle casing, and a vehicle frame above said casing, of equalizing members fulcrumed relative to said casing, buffers intermediate the ends of said equalizing members, longitudinally alining springs above said equalizing members and connected to the ends thereof, buffers intermediate the ends of said springs, and means of articulating the ends of said springs with said vehicle frame.

In testimony whereof I affix my signature in the presence of two witnesses.

NELS L. OLSON.

Witnesses:
 ANNA M. DORR,
 CHAS. W. STAUFFIGER.

Copies of this patent may be obtained for five cents each, by addressing the "Commissioner of Patents, Washington, D. C."